United States Patent
Cook (10) Patent No.: US 9,721,301 B2
(45) Date of Patent: Aug. 1, 2017

(54) VEHICLE REPAIR COST ESTIMATE ACQUISITION SYSTEM AND METHOD

(75) Inventor: Ingrid Cook, Olive Branch, MS (US)

(73) Assignee: SHzoom LLC, Memphis, TN (US)

( * ) Notice: Subject to any disclaimer, the term of this patent is extended or adjusted under 35 U.S.C. 154(b) by 0 days.

(21) Appl. No.: 13/164,714

(22) Filed: Jun. 20, 2011

(65) Prior Publication Data

US 2011/0313951 A1 Dec. 22, 2011

Related U.S. Application Data

(60) Provisional application No. 61/356,592, filed on Jun. 19, 2010.

(51) Int. Cl.
*G06Q 40/08* (2012.01)
*G06Q 10/04* (2012.01)
*G06Q 30/02* (2012.01)

(52) U.S. Cl.
CPC ............ *G06Q 40/08* (2013.01); *G06Q 10/04* (2013.01); *G06Q 30/0283* (2013.01)

(58) Field of Classification Search
CPC .................................................... G06Q 40/08
See application file for complete search history.

(56) References Cited

U.S. PATENT DOCUMENTS

| | | | |
|---|---|---|---|
| 5,317,503 A * | 5/1994 | Inoue | ............................ 700/90 |
| 6,185,540 B1 * | 2/2001 | Schreitmueller | ...... G06Q 30/06 705/4 |
| 6,263,322 B1 * | 7/2001 | Kirkevold | .......... G06Q 30/0283 705/400 |
| 6,311,162 B1 * | 10/2001 | Reichwein et al. | ........... 705/1.1 |
| 7,636,676 B1 * | 12/2009 | Wolery et al. | ............... 705/26.4 |
| 8,131,417 B2 | 3/2012 | Picard | |
| 8,650,068 B2 | 2/2014 | Esser et al. | |

(Continued)

FOREIGN PATENT DOCUMENTS

KR   20030019789   *   3/2003   ............... H04Q 7/24

OTHER PUBLICATIONS

PR Newswire, "The Hertz Corporation Adopts OEConnection Technology to Speed Vehicle Repair Process," PR Newswire Association LLC, Sep. 9, 2008.*

(Continued)

*Primary Examiner* — Nathan Erb
(74) *Attorney, Agent, or Firm* — Fenwick & West LLP (57) ABSTRACT

A computer-based method for obtaining repair estimates for a vehicle, and a related network server, are provided. The method comprises receiving a vehicle identification number (VIN) over a network from a customer computer, retrieving vehicle information, associated with the VIN, from a database, sending the vehicle information and a graphical representation of the vehicle, including a plurality of selectable vehicle damage locations, over the network to the customer computer, receiving a selection of at least one vehicle damage location over the network from the customer computer, receiving at least one image of the vehicle over the network from the customer computer, storing the vehicle information, the selected damage location and the vehicle image as a repair job in a non-volatile memory or the database, and sending a notification, indicating that the new repair job is available for review, over the network to at least one repair provider computer.

11 Claims, 10 Drawing Sheets

(56) References Cited

U.S. PATENT DOCUMENTS

| | | | |
|---|---|---|---|
| 2002/0055861 A1* | 5/2002 | King et al. | 705/4 |
| 2003/0138475 A1* | 7/2003 | Chen | 424/435 |
| 2004/0073434 A1 | 4/2004 | Volquardsen et al. | |
| 2006/0064393 A1 | 3/2006 | Orr | |
| 2006/0242089 A1* | 10/2006 | Vahidi | G06Q 10/10 |
| | | | 705/400 |
| 2007/0250232 A1* | 10/2007 | Dourney et al. | 701/35 |
| 2007/0293997 A1* | 12/2007 | Couch | G01M 17/00 |
| | | | 701/31.4 |
| 2008/0255887 A1 | 10/2008 | Gruter | |
| 2009/0018859 A1 | 1/2009 | Purifoy et al. | |
| 2009/0062978 A1* | 3/2009 | Picard | 701/29 |
| 2009/0106052 A1* | 4/2009 | Moldovan | G06Q 10/10 |
| | | | 705/4 |
| 2009/0150200 A1 | 6/2009 | Siessman | |
| 2011/0313951 A1 | 12/2011 | Cook | |
| 2013/0204797 A1 | 8/2013 | Kleinschmidt et al. | |
| 2014/0058764 A1 | 2/2014 | Vahidi et al. | |
| 2014/0067637 A1 | 3/2014 | Vahidi et al. | |
| 2015/0103170 A1 | 4/2015 | Nelson et al. | |

OTHER PUBLICATIONS

"www.TradesmenBids.com," last visited Jun. 20, 2011.

"Best Auto Repair Software | 2015 Reviews of the Most Popular Systems," Capterra, Inc., 2015, 22 pages, [Online] [Retrieved on Jun. 30, 2015] Retrieved from the Internet<URL:http://www.capterra.com/auto-repair-software/>.

PCT International Search Report, PCT Application No. PCT/US11/41096, Sep. 27, 2011, 2 pages.

PCT Written Opinion, PCT Application No. PCT/US11/41096, Sep. 27, 2011, 4 pages.

* cited by examiner

VEHICLE REPAIR COST ESTIMATE ACQUISITION SYSTEM AND METHOD

CROSS-REFERENCE TO RELATED APPLICATIONS

This application claims priority to U.S. Provisional Patent Application No. 61/356,592, filed on Jun. 19, 2010, the disclosure of which is incorporated herein by reference in its entirety.

FIELD OF THE INVENTION

The present invention relates to vehicle repair. More particularly, the present invention relates to network-based vehicle repair cost estimate acquisition systems and methods.

BACKGROUND OF THE INVENTION

It is readily apparent to an observer of the vehicle repair industry that the traditional way of securing repair cost estimates for minor vehicle damage is outdated, inefficient, timely, and costly. When faced with this type of repair, many consumers struggle with a fundamental choice, i.e., whether to submit an insurance claim for the repair or pay the cost of the repair themselves.

If the consumer decides to submit a claim to the insurance company, traditionally the consumer will have to wait for three different estimates before the repairs actually begin. First, the consumer waits for the insurance company to dispatch an adjuster to estimate the cost of repairs. Generally, the consumer must then blindly decide which shop will complete the repairs. When the consumer does decide on a shop, a second estimate is written by the repair shop. This estimate is often times drastically different from the estimate written by the insurance adjuster. In this case, the shop contacts the insurance adjuster for another inspection of the vehicle. Finally, when an agreed cost to repair is reached between the insurance company and the shop, a third estimate is written and repairs to the consumer's vehicle begin.

Since this traditional method also results in higher operating expenses for the insurance company, ultimately all consumers who own insurance policies are indirectly impacted as these costs are often passed onto the policyholder in the form of increased policy premiums. Even when the consumer decides not to report the minor damage to the insurance company, many vehicle repair shops inflate the estimated cost to repair presumably in order recoup losses in the lower, negotiated repair rates with insurance companies. Consequently, a customer who desires to pay the repair cost himself is often at the mercy of the local repair shop, and securing estimates from several local repair shops usually involves unreasonable outlays of time and effort because the damaged vehicle must be driven to each repair shop so that the vehicle can be inspected prior to the quote. An improved process, addressing these issues, is long overdue.

SUMMARY OF THE INVENTION

Embodiments of the present invention advantageously provide a computer-based method for obtaining repair cost estimates for a vehicle, as well as a related network server.

In one embodiment, the method comprises receiving a vehicle identification number (VIN) over a network from a customer computer, retrieving vehicle information, associated with the VIN, from a database, sending the vehicle information and a graphical representation of the vehicle, including a plurality of selectable vehicle damage locations, over the network to the customer computer, receiving a selection of at least one vehicle damage location over the network from the customer computer, receiving at least one image of the vehicle over the network from the customer computer, storing the vehicle information, the selected damage location and the vehicle image as a repair job in a non-volatile memory or the database, and sending a notification, indicating that the new repair job is available for review, over the network to at least one repair provider computer.

In another embodiment, a network server comprises a processor coupled to a network and a database, and a memory, coupled to the processor, storing instructions adapted to be executed by the processor to perform a method for estimating repair costs for a vehicle as outlined above.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout.

Embodiments of the present invention advantageously provide the customer and the insurance company with a computer-based method for obtaining repair cost estimates. By incorporating this new technology, consumers and insurance companies are able to receive and review repair cost estimates from an unlimited number of shops prior to deciding who will complete the repair. The present invention advantageously overcomes the problems associated with the traditional method of obtaining repair cost estimates as it increases efficiency, reduces costs, and improves repair cycle time. Also, the general population as a whole benefits from the present invention as it allows for a significant reduction in drive time resulting in less pollution and dependency on our already strained system of transportation.

The inventive systems and methods described herein advantageously allow consumers to obtain competitive estimate quotes and quality repairs without driving from shop to shop or searching website after website for the "right" vehicle repair shop. If an insurance claim is contemplated, consumers do not need to wait for their insurance company representatives to inspect, negotiate and decide what, when and how the repairs will be undertaken using the inventive systems and methods described herein.

Additionally, smaller vehicle repair shops, who may not be able to afford advertising and marketing costs but still provide reputable vehicle service and repairs, are able to effectively compete with industry leaders, expand their customer base, and improve profits without incurring massive advertising and marketing fees. In other words, these smaller vehicle repair providers are no longer penalized simply for being small. On the other hand, vehicle insurance professionals can grow their businesses independently, rather than consolidating, using the inventive systems and methods described herein.

It is noted that online marketplaces for physical goods and services have generally enabled consumers to compare prices and make such purchases more efficiently and often times less costly. However, none of the known online marketplaces embody the many advantageous features of the present invention.

While there is no limitation with respect to who can use the present invention, it should be realized that the inventive systems and methods described herein will be of most beneficial to vehicle owners and auto insurance professionals, such as, for example, vehicle repair and/or body shops, insurance adjusters, attorneys, salvage yards, rental car agencies, etc. As noted above, the customer may be a vehicle owner who does not want to submit a claim to an insurance company, and, instead, wishes to directly manage the repairs, or, alternatively, a customer who only wishes to perform partial repairs to the vehicle. For purposes of the present invention, the term "vehicle repair" is also intended to include all aspects of vehicle repairs resulting from a vehicle accident, loss, collision, vandalism, natural disaster, etc.

Figure 1:
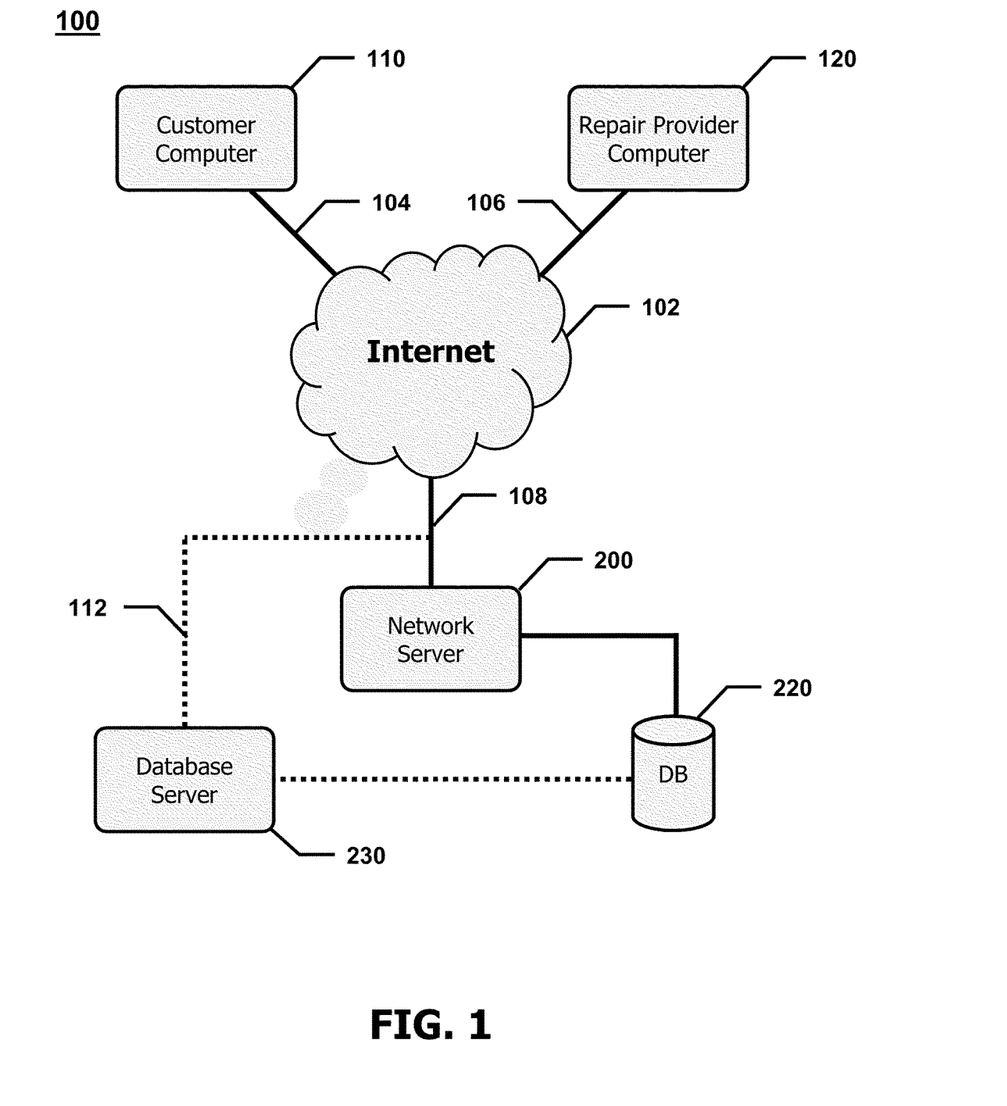
FIG. 1 depicts a block diagram of a network-based vehicle repair cost estimate acquisition system, in accordance with an embodiment of the invention.

FIG. 1 depicts a block diagram of a network-based vehicle repair cost estimate acquisition system 100, in accordance with an embodiment of the invention. Customer computer 110, repair provider computer 120 and network server 200 are connected to network 102 through various network connections 104, 106 and 108, respectively. In a preferred embodiment, network 102 is the Internet, however, in other embodiments, network 102 may be a wide area network (WAN), a local area network (LAN), a cellular network, a wireless (WiFi) network, etc., or any combinations of networks. Generally, network connections 104, 106 and 108 may be any of these networks or combinations thereof; other connection mechanisms are also contemplated, such as, for example, dial-up, ADSL, cable modems, PPP, fiber, etc. Regardless of the type of network or method of connection, customer computer 110 and repair provider computer 120 are coupled to network server 200 via one or more networks or network connections in order to exchange data, as is well known in the art. In several embodiments, customer computer 110 and repair provider computer 120 can also exchange data over network 102.

Customer computer 110 and repair provider computer 120 are preferably personal desktop or laptop computers (PCs), or, more generally, network-capable computers or digital devices, such as, for example, personal digital assistants, smart phones, tablet computers, etc.

Figure 2:
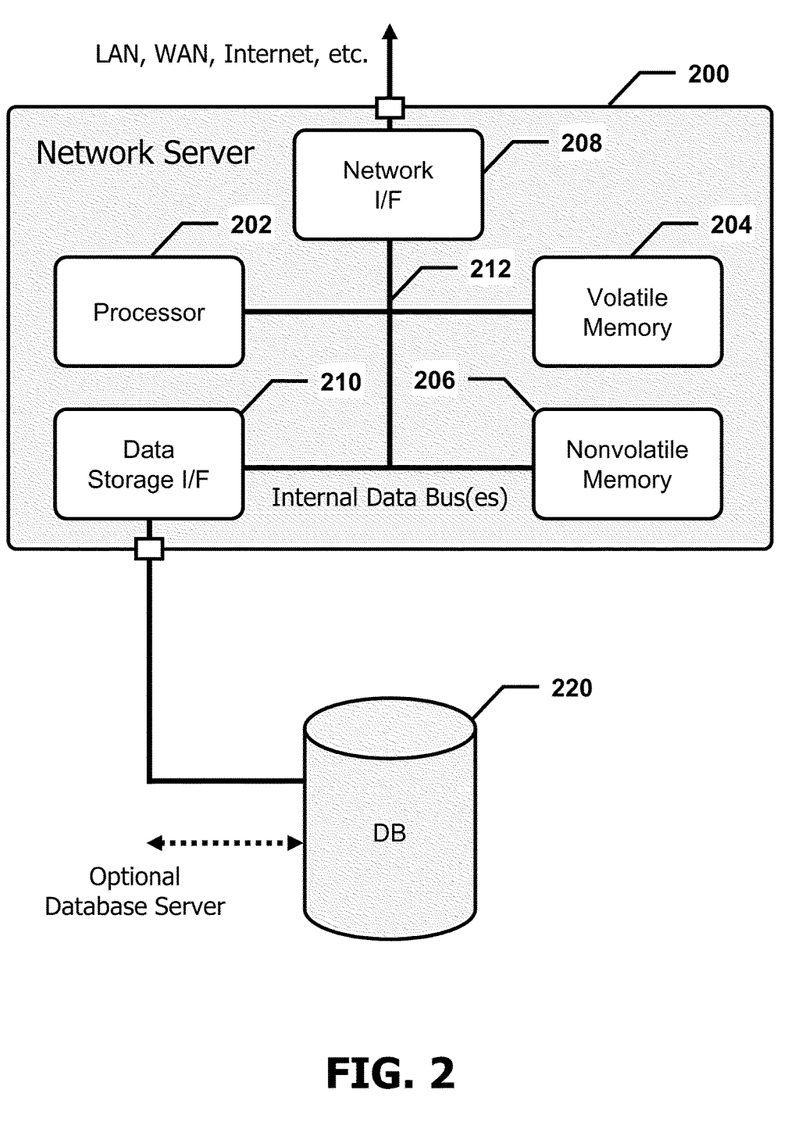
FIG. 2 depicts a block diagram of a vehicle repair cost estimate acquisition network server, in accordance with an embodiment of the invention.

FIG. 2 depicts a block diagram of a vehicle repair cost estimate acquisition network server 200, in accordance with an embodiment of the invention. Network server 200 includes, inter alia, a processor 202 coupled to volatile memory 204, nonvolatile memory 206, a network interface 208, an external data storage interface 210, etc., by one or more internal data buses 212. Other components may also be provided. Database 220, generally representing one or more databases, data structures, file storage systems, etc., is stored on one or more hard disks, RAID arrays, disk farms, etc., internal or external to network server 200. Alternatively, database 220 may be hosted by a separate network database server 230, e.g., a database management system (DBMS), etc., coupled to network 102 and/or network connection 108 via network connection 112, as illustrated in FIG. 1.

Figure 3:
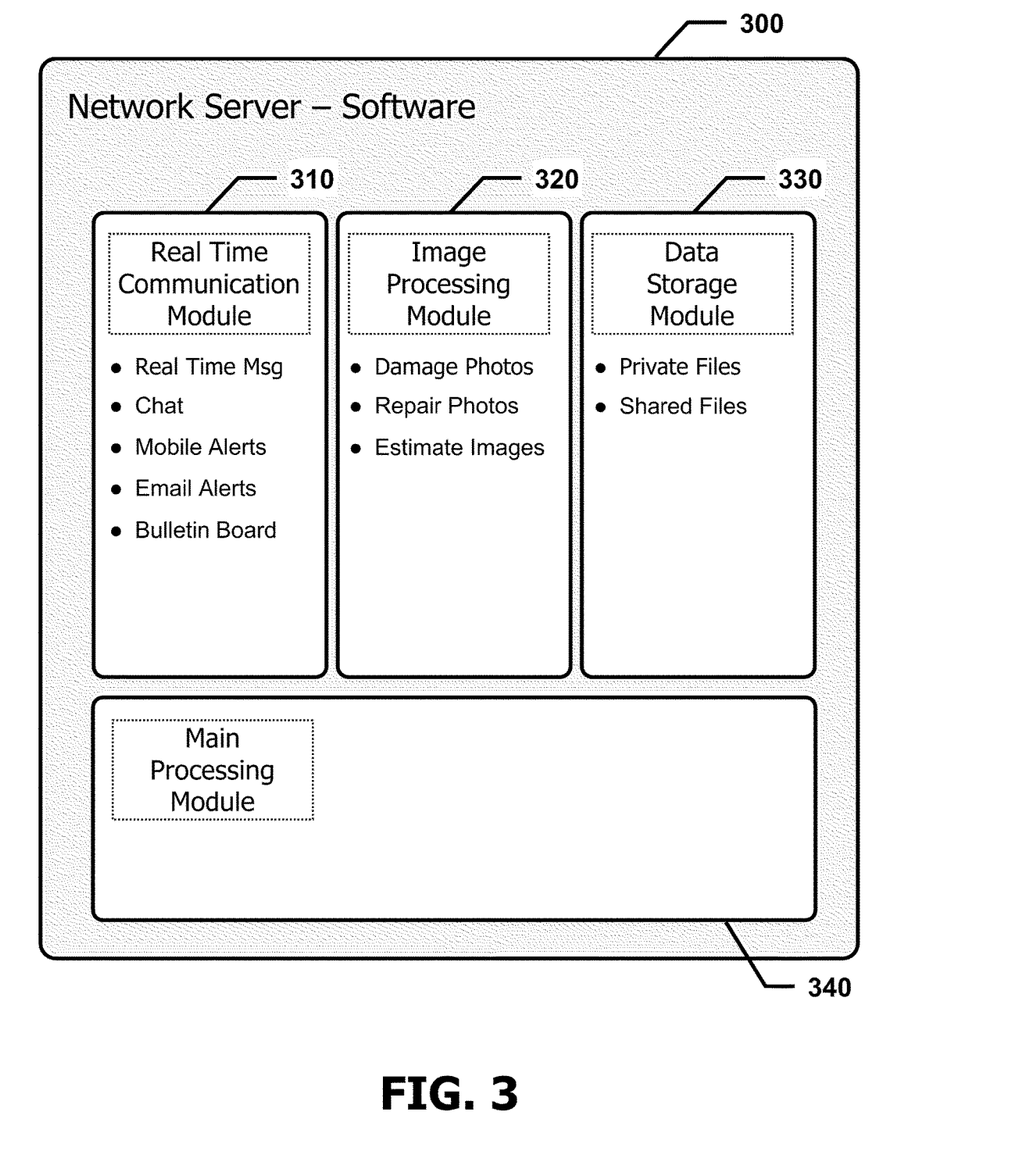
FIG. 3 depicts a representation of the software executed by a vehicle repair cost estimate acquisition network server, in accordance with embodiments of the invention.

FIG. 3 depicts a representation of the network server software 300 executed by the network server 200, in accordance with embodiments of the invention. Network server software 300 may include, inter alia, a real time communication module 310, which provides various communications functionalities, such as real time messaging, chat, mobile alerts, email alerts, bulletin board access, etc., an image processing module 320, which manipulates damage photos, repair photos, estimate images, etc., a data storage module 330, which manages database access, private files, shared files, etc., and a main processing module 340, which may include web page hosting software, enterprise software, server software, etc., as well as implementations of the inventive methods described herein. This description is not intended to be exhaustive or all-inclusive, and other software modules, components, etc. may be, and are, included within network server software 300, as known in the art.

In a preferred embodiment, network-based vehicle repair cost estimate acquisition system 100 is world-wide-web (www) based, and network server 200 is a web server delivering HTML, XML, etc., web pages to customer computer 110 and repair provider computer 120. In other embodiments, a traditional client-server architecture may be implemented, in which network server 200 executes enterprise and custom software, exchanging data with custom client applications running on customer computer 110 and repair provider computer 120.

Figure 4:
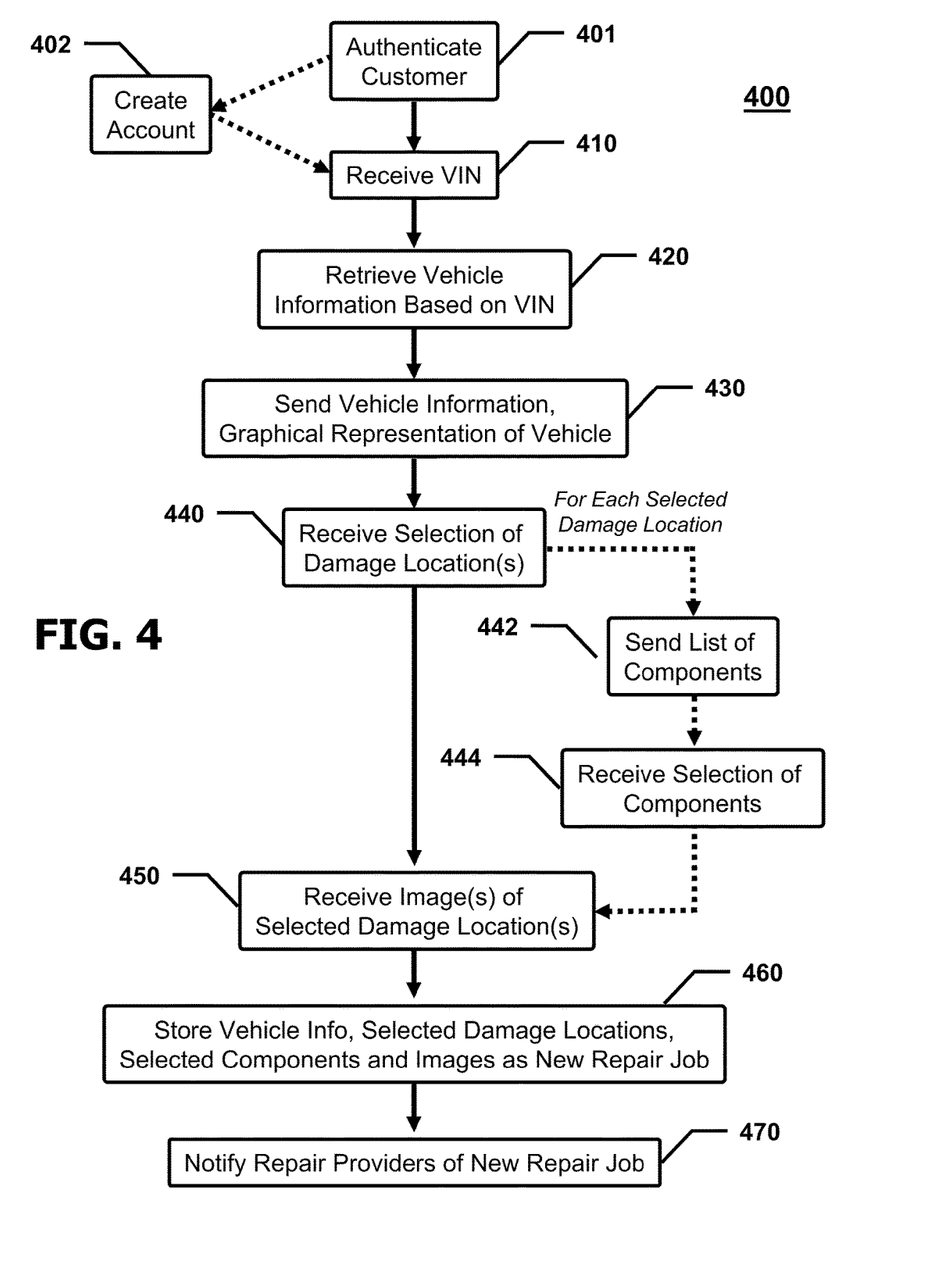
FIG. 4 presents a flow chart of a computer-based method for obtaining vehicle repair cost estimates for a vehicle, in accordance with an embodiment of the invention.

FIG. 4 presents a flow chart of a computer-based method 400 for obtaining repair cost estimates for a vehicle, in accordance with an embodiment of the invention. This method executes on network server 200, and, in a preferred embodiment, network server 200 primarily interacts with customer computer 110 and repair provider computer 120 via web pages delivered to web browsers executing on each computer. Additional communication methods are also contemplated, including, for example, text messages over one or more cellular networks, email messages over network 102, etc. In a preferred embodiment, the customer launches a web browser on customer computer 110 and enters the network address (e.g., URL) for network server 200 in the address line; in response, network server 200 provides an initial web page over network 102 for display on customer computer 110.

Figure 6:
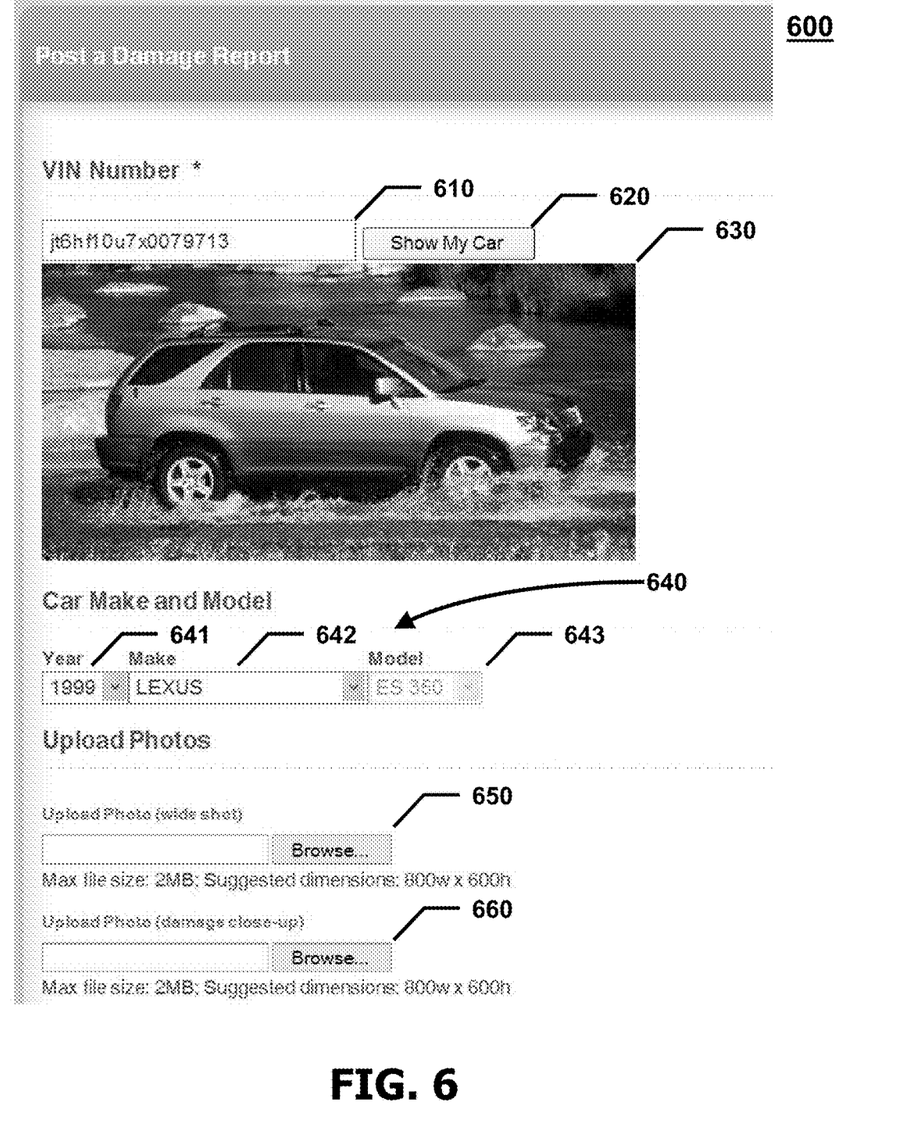
FIGS. 6, 7 and 8 illustrate partial screen shots of a graphical user interface associated with at least a portion of the method depicted in FIG. 4, in accordance with a web-based embodiment of the invention.
Figure 7:
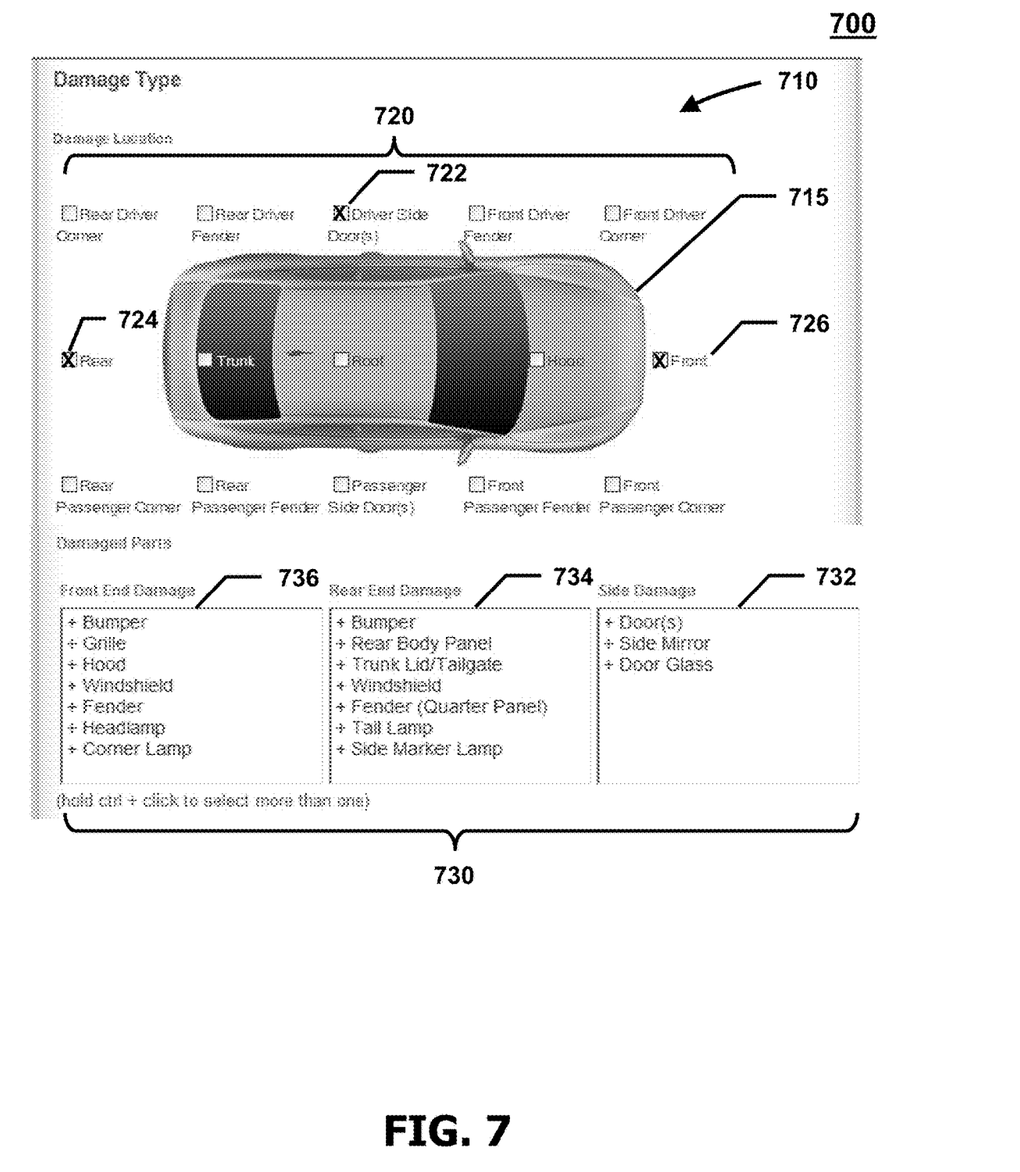
Figure 8:
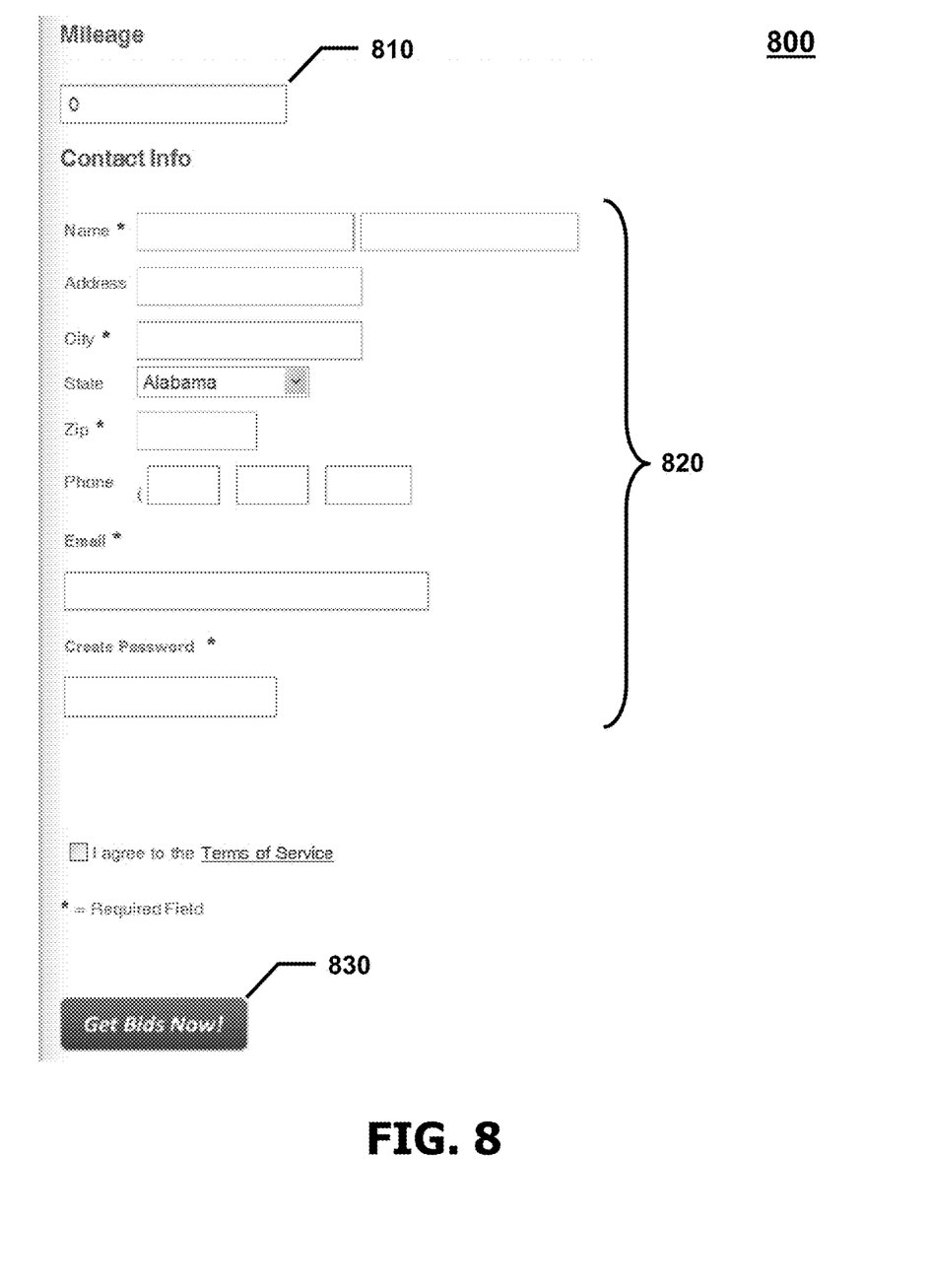

FIGS. 6, 7 and 8 illustrate partial screen shots 600, 700, 800 of a graphical user interface associated with at least a portion of the method depicted in FIG. 4, in accordance with a web-based embodiment of the invention, and will be referred to during the description of the method.

In one embodiment, network server 200 first authenticates (401) customer computer 110 by requesting a username/password combination, which may be created (402) beforehand or contemporaneously, as is well known in the art. After authentication, the initial web page described above is sent over network 102 for display on customer computer 110, which includes, inter alia, an input field 610 for the vehicle identification number (VIN). The customer enters the VIN in input field 610 and selects a send or submit button 620, labeled as "Show My Car" in FIG. 6. Network server 200 then receives (410) the VIN over network 102 from customer computer 110.

In response to receiving the VIN, network server 200 retrieves (420) vehicle information, associated with the VIN, from database 220, which may be directly connected to network server 200 using data storage interface 210, connected to network server 200 over a local area network or indirectly connected to network server 200 by an optional database server 230 over network connection 112. The vehicle information includes the year, make and model of the vehicle, as well as other, optional information, such as, for example, a digital image of the vehicle.

Network server 200 then creates a graphical representation of the vehicle 710 that includes including a plurality of selectable vehicle damage locations. In a preferred embodiment, the graphical representation of the vehicle 710 includes an overhead image of the vehicle 715 and a plurality of selectable icons 720 surrounding, and/or superimposed on, the image 715. The vehicle information and the graphical representation of the vehicle 710 are sent (430) over network 102 to customer computer 110 for display. In one embodiment, the customer may modify the year, make or model of the vehicle information 640 via pull down menus 641, 642, 643. In another embodiment, a digital image of the vehicle 630 is also sent and displayed with the vehicle information 640.

Generally, the customer now selects at least one of the possible vehicle locations that may be damaged, and provides at least one digital image of the damaged locations. For example, the customer selects at least one icon 720, and, in the illustrated embodiment, identifies one or two digital images 650, 660, e.g., a wide shot and/or a close up shot, respectively, that are stored on customer computer 110. The selected damage locations and digital images are sent to network server 200 when the send or submit button 830 is selected, labeled as "Get Bids Now!" in FIG. 8. In this embodiment, network server 200 receives (440) the selection of damage locations and receives (450) the digital images of the vehicle at the same time, along with other, optional information provided by the customer, such as, for example, the mileage 810 of the vehicle, customer contact info 820, etc.

In a preferred embodiment, each selection of an icon 720 is immediately transmitted from customer computer 110, over network 102, and received (440) by network server 200, which then retrieves a list of components associated with the selected damage location from nonvolatile memory 206 or database 220. Network server 200 then sends (442) the list of components over network 102 to customer computer 110, which is displayed to the customer. As depicted in FIG. 7, for example, the driver side door 722, rear 724 and front 726 have been selected, and the respective component lists 730, including side components 732, rear components 734 and front components 736, have been retrieved, transmitted and displayed to the customer, who then selects one or more components from each list. The component selections and digital images are sent to network server 200 when the send or submit button 830 is selected, labeled as "Get Bids Now!" in FIG. 8. In this embodiment, network server 200 receives (444) the selection of components and receives (450) the digital images of the vehicle at the same time, along with other, optional information provided by the customer, such as, for example, the mileage 810 of the vehicle, customer contact info 820, etc.

Network server 200 then stores (460) the vehicle information, the selected damage locations (and components, if any), and the digital images of the vehicle as a new repair job in a non-volatile memory 206 or database 220.

Finally, network server 200 sends (470) a notification, indicating that the new repair job is available for review, over network 102 to the repair provider computer 120. The notification can be an email message, a pop-up browser window or alert message on the repair provider computer 120, a text message to the repair provider's cell phone or smart phone, etc.

Figure 5:
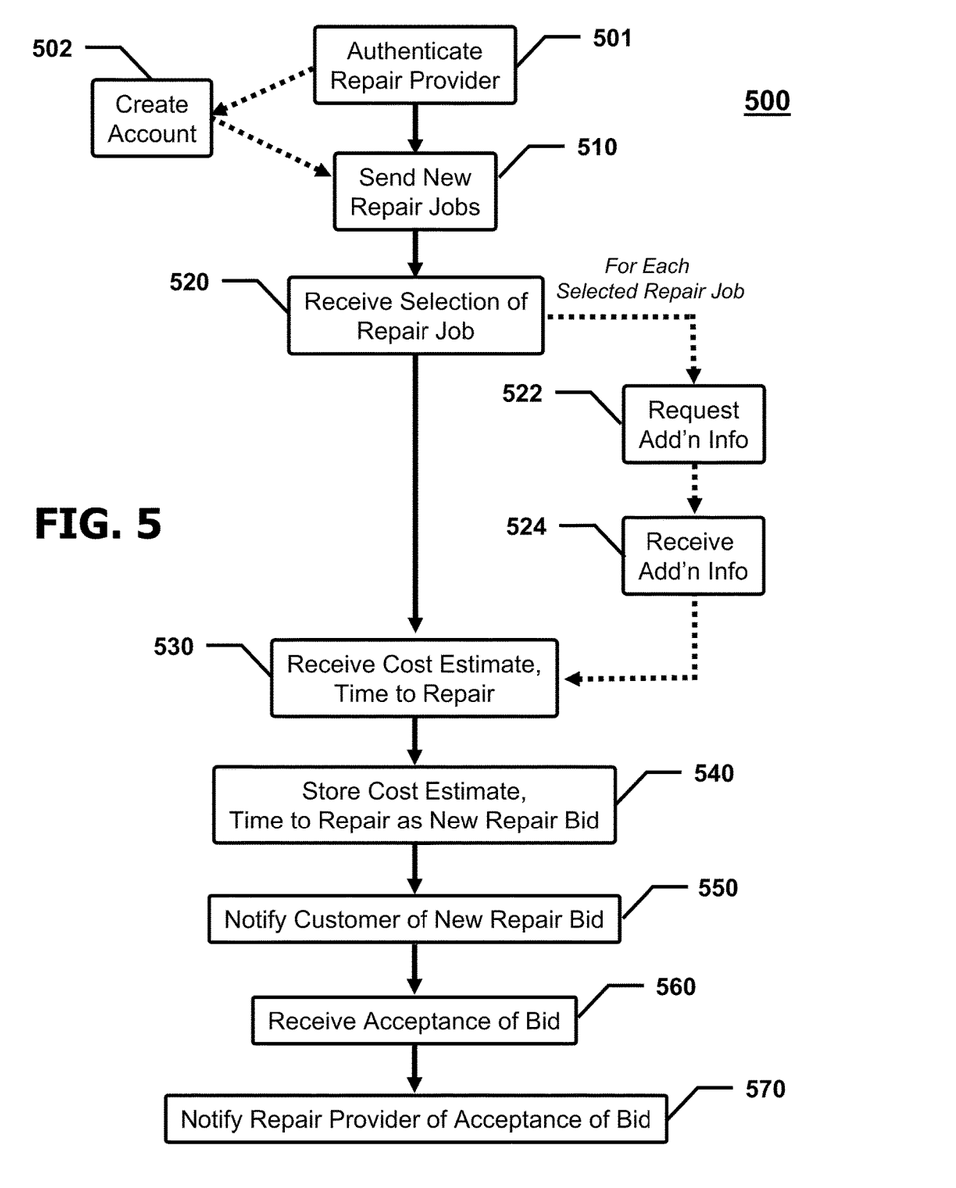
FIG. 5 presents a supplemental flow chart for the method depicted in FIG. 4, in accordance with an embodiment of the invention.

FIG. 5 presents a supplemental flow chart for the method depicted in FIG. 4, in accordance with an embodiment of the invention. In a preferred embodiment, the repair provider launches a web browser on repair provider computer 120 and enters the network address (e.g., URL) for network server 200 in the address line; in response, network server 200 provides an initial web page over network 102 for display on repair provider computer 120.

Figure 9:
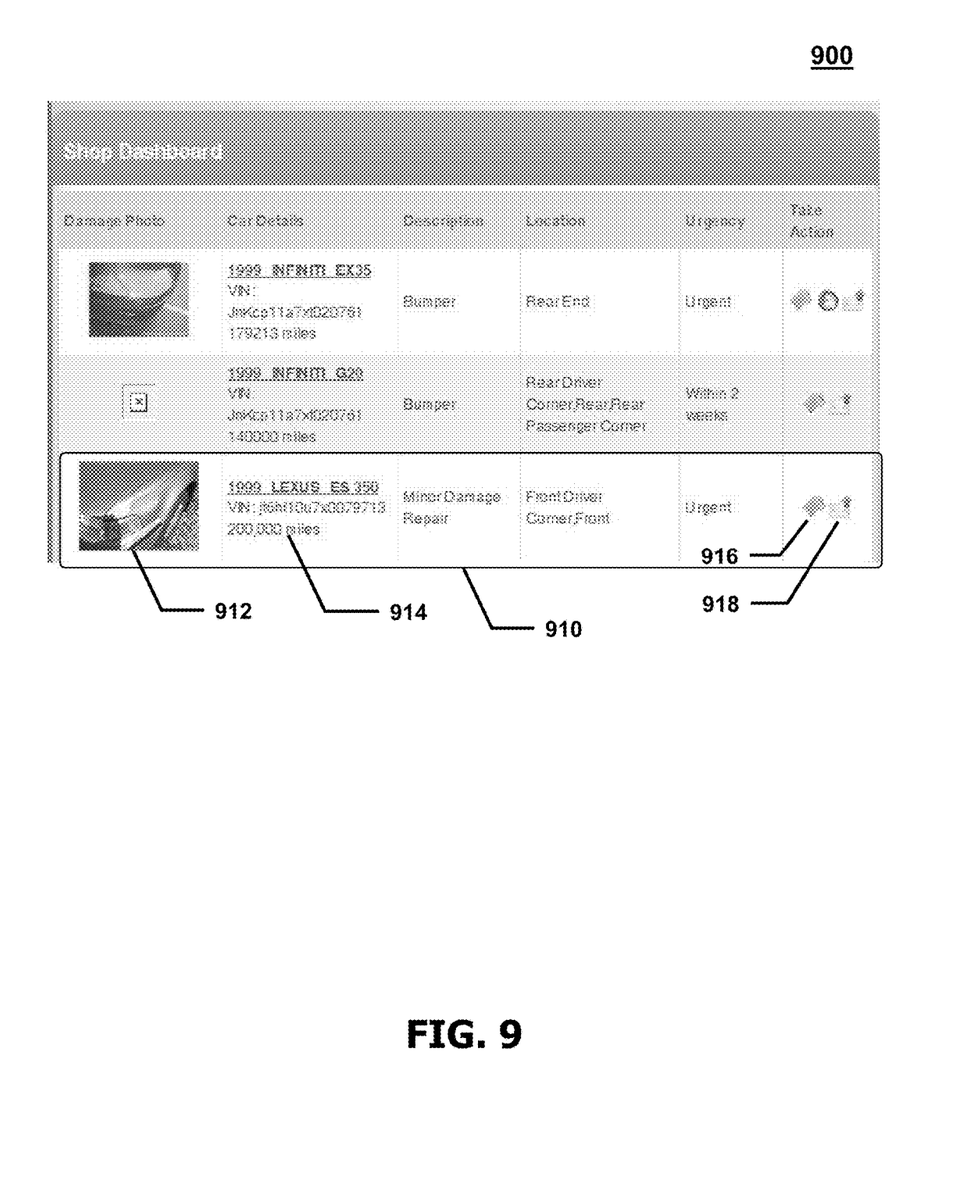
FIGS. 9 and 10 illustrate partial screen shots of a graphical user interface associated with at least a portion of the method depicted in FIG. 5, in accordance with a web-based embodiment of the invention.
Figure 10:
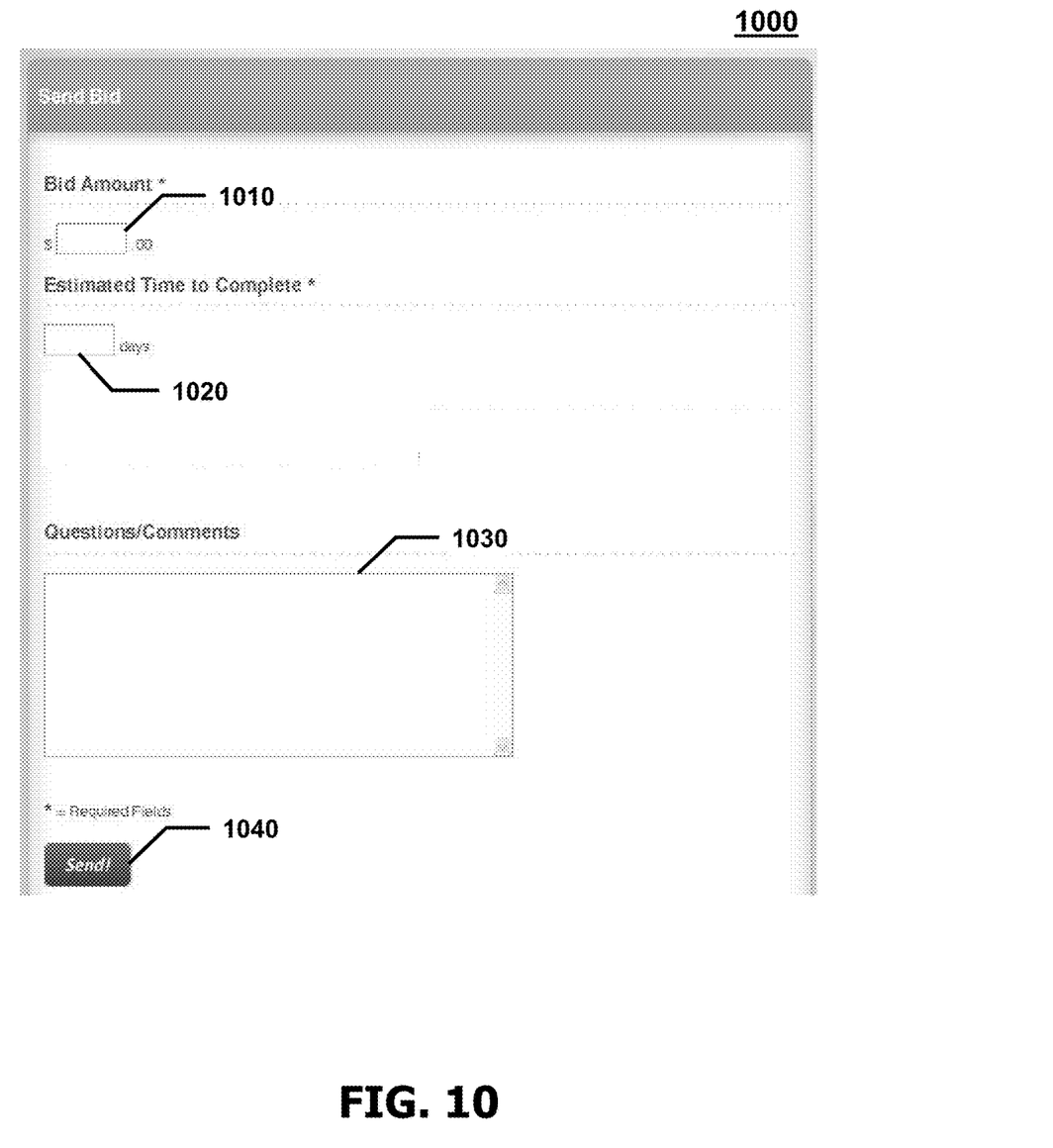

FIGS. 9 and 10 illustrate partial screen shots 900, 1000 of a graphical user interface associated with at least a portion of the method depicted in FIG. 5, in accordance with a web-based embodiment of the invention, and will be referred to during the description of the method.

In one embodiment, network server 200 first authenticates (501) repair provider computer 120 by requesting a username/password combination, which may be created (502) beforehand, as is well known in the art. After authentication, the initial web page described above is sent (510) over network 102 for display on repair provider computer 120, which includes, inter alia, at least one repair job 910. FIG. 9 depicts three (3) repair jobs, each one including relevant information, such as, for example, a digital image 912 of the vehicle damage location, vehicle information 914, a description, a location, an urgency, etc., as well as one or more selectable icons including a prepare bid 916 icon and a send message 918 icon.

Generally, the repair provider now selects one of the repair jobs, and provides a bid amount 1010, estimated time to complete 1020, and optional questions/comments 1020. The bid is sent to network server 200 when the send or submit button 1040 is selected, labeled as "Send!" in FIG. 10. In this embodiment, network server 200 receives (520) the repair job selection and receives (530) the bid amount 1010 and estimated time to complete 1020 at the same time, along with optional questions/comments 1030.

In an alternative embodiment, the repair provider can request additional information by selecting the send message 918 icon. Network server 200 then receives the request for additional information over network 102 from repair provider computer 120, and sends (522) the request for additional information over network 102 to customer computer 110. After the additional information is received (524) from customer computer 110, network server 200 sends the additional information to repair provider computer 120. The bid amount 1010, estimated time to complete 1020, and optional questions/comments 1020 are sent (530) to network server 200 when the send or submit button 1040 is selected, labeled as "Send!" in FIG. 10.

Network server 200 then stores (540) the bid amount 1010 and estimated time to complete 1020 as a new repair bid in a non-volatile memory 206 or database 220.

Network server 200 then sends (550) a notification, indicating that the new repair bid is available for review, over network 102 to the customer computer 110. The notification can be an email message, a pop-up browser window or alert message on the repair provider computer 120, a text message sent to the customer's cell phone or smart phone, etc.

The customer then accepts (560) the repair bid, using the customer computer 110 or a digital device, and, finally, network server 200 sends (570) a notification, indicating that the repair bid has been accepted, over network 102 to the repair provider computer 120.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A computer-based method, comprising:
    storing, in a first database, vehicle information for a plurality of vehicles, the vehicle information for each vehicle comprising:
        a vehicle identification number (VIN) associated with a specific year, make, and model of a vehicle;
        a representation corresponding to the vehicle, each representation comprising a plurality of predetermined selectable damage locations corresponding to different portions of the vehicle, the representation associated with the VIN; and
        a list of vehicle components associated with each predetermined selectable damage location;
    receiving, at a network server, a VIN for a vehicle of a consumer from a consumer computing device of the consumer, wherein the consumer computing device is not pre-loaded with images of all of the plurality of vehicles and the associated vehicle components for the plurality of vehicles;
    in response to receiving the VIN from the consumer computing device, by the network server:
        retrieving, by the network server from the first database, the vehicle information comprising the representation corresponding to the vehicle associated with the VIN;
        creating an image including selectable damage locations corresponding to the vehicle associated with the received VIN, the image based on the representation corresponding to the vehicle stored in the first database; and
        sending, to the consumer computing device, the created image including the selectable damage locations corresponding to the vehicle for display in a user interface at the consumer computing device;
    receiving, by the network server from the consumer computing device, a selection from within the user interface on the consumer computing device of at least one of the plurality of predetermined selectable damage locations, and at least one image of an actually damaged location of the vehicle that is retrieved from a memory of the consumer computing device;
    in response to receiving the selection of the at least one of the plurality of predetermined selectable damage locations:
        retrieving, by the network server, the stored list of vehicle components associated with the selected at least one of the plurality of predetermined selectable damage locations for the vehicle associated with the received VIN; and
        transmitting the list of vehicle components from the network server to the consumer computing device;
    receiving, by the network server from the consumer computing device, a selection from within the user interface of at least one vehicle component from the transmitted list of vehicle components associated with the selected at least one damage location; and
    creating, in response to receiving the selection from within the user interface of the at least one vehicle component, a new repair job record for estimating a repair of the vehicle, the repair job record comprising the retrieved vehicle information, the selected at least one damage location, the selected at least one vehicle component, and the at least one image of the actually damaged location.

2. The method of claim 1, further comprising:
    receiving, by the network server from a repair provider, a selection of the repair job record;
    receiving, by the network server from the repair provider, a repair bid comprising a bid amount and an estimated time to complete the repair for the selected repair job record;
    storing, by the network server, the repair bid in a second database and associating, by the network server, the repair bid with the repair job record in the first database; and
    providing, for display to the consumer computing device, a notification indicating that the repair bid is available for review.

3. The method of claim 2, further comprising for the selected repair job record:
    receiving, from the repair provider, a request for additional information; and
    sending the additional information to the repair provider.

4. The method of claim 2, wherein the notification is a text message.

5. The method of claim 1, wherein the created image including selectable damage locations corresponding to the vehicle is created by the network server using information about the vehicle based on the VIN for the vehicle.

6. The method of claim 1, further comprising:
storing the new repair job record in a second database; and
transmitting, from the network server to a computing device of at least one repair provider, a notification indicating that the new repair job record is available for review in the second database.

7. A network server, comprising:
a processor coupled to a network and a first database; and
a memory, coupled to the processor, storing instructions which, upon execution by the processor, cause the processor to perform a method comprising:
  storing, in a first database, vehicle information for a plurality of vehicles, the vehicle information for each vehicle comprising:
    a vehicle identification number (VIN) associated with a specific year, make, and model of a vehicle;
    a representation corresponding to the vehicle, each representation comprising a plurality of predetermined selectable damage locations corresponding to different portions of the vehicle, the representation associated with the VIN; and
    a list of vehicle components associated with each predetermined selectable damage location;
  in response to receiving a VIN for a vehicle of a consumer from a consumer computing device of the consumer that is not pre-loaded with images of all of the plurality of vehicles and the associated vehicle components for the plurality of vehicles:
    retrieving, by the network server from the first database, the vehicle information comprising the representation corresponding to the vehicle associated with the VIN; and
    creating, by the network server, an image including selectable damage locations corresponding to the vehicle associated with the VIN, the image based on the representation corresponding to the vehicle stored in the first database;
  sending, by the network server to the consumer computing device, the created image including the selectable damage locations corresponding to the vehicle for display in a user interface at the consumer computing device;
  receiving, by the network server from the consumer computing device, a selection from within the user interface on the consumer computing device of at least one of the plurality of predetermined selectable damage locations, and at least one image of an actually damaged location of the vehicle that is retrieved from a memory of the consumer computing device;
  in response to receiving the selection of the at least one of the plurality of predetermined selectable damage locations:
    retrieving the stored list of vehicle components associated with the selected at least one of the plurality of predetermined selectable damage locations for the vehicle associated with the received VIN; and
    transmitting the list of vehicle components from the network server to the consumer computing device;
  receiving, by the network server from the consumer computing device, a selection from within the user interface of at least one vehicle component from the transmitted list of vehicle components associated with the selected at least one damage location; and
  creating, in response to receiving the selection from within the user interface of the at least one vehicle component, a new repair job record for estimating a repair of the vehicle, the repair job record comprising the retrieved vehicle information, the selected at least one damage location, the selected at least one vehicle component, and the at least one image of the actually damaged location.

8. The network server of claim 7, wherein the instructions further comprise instructions for:
receiving, from a repair provider, a selection of the repair job record;
receiving, from the repair provider, a repair bid comprising a bid amount and an estimated time to complete the repair for the selected repair job record;
associating the repair bid with the repair job record; and
providing, for display to the consumer computing device, a notification indicating that the repair bid is available for review.

9. The network server of claim 8, wherein, for each selected repair job record, the instructions further comprise instructions for: receiving, from the repair provider, a request for additional information; and sending the additional information to the repair provider.

10. The network server of claim 8, wherein the notification is a text message.

11. The network server of claim 7, wherein the memory further stores instructions for:
storing the new repair job record in a second database; and
transmitting, from the network server to a computing device of at least one repair provider, a notification indicating that the new repair job record is available for review in the second database.

* * * * *